United States Patent [19]

Williamson, Jr.

[11] Patent Number: 4,966,183
[45] Date of Patent: Oct. 30, 1990

[54] PRESSURE REGULATOR

[75] Inventor: Felton Williamson, Jr., Fraser, Mich.

[73] Assignee: Master Pneumatic-Detroit, Inc., Sterling Heights, Mich.

[21] Appl. No.: 432,810

[22] Filed: Nov. 6, 1989

[51] Int. Cl.$^5$ .......................................... G05D 16/00
[52] U.S. Cl. ............................... 137/116.5; 137/489; 137/492.5
[58] Field of Search ............... 137/116.5, 505.11, 489, 137/492, 492.5

[56] References Cited

U.S. PATENT DOCUMENTS

| | | | |
|---|---|---|---|
| 2,918,081 | 12/1959 | Lauer | 137/505.11 |
| 3,204,657 | 9/1965 | Boyd | 137/116.5 X |
| 3,488,685 | 1/1970 | Hughes | 137/116.5 |
| 3,705,599 | 12/1972 | Steward | 137/505.11 X |
| 3,971,410 | 7/1976 | St. Clair | 137/116.5 X |
| 4,171,004 | 10/1979 | Cerrato | 137/505.11 X |

*Primary Examiner*—Alan Cohan
*Attorney, Agent, or Firm*—Barnes, Kisselle, Raisch, Choate, Whittemore & Hulbert

[57] ABSTRACT

A gas pressure regulator with an inlet, outlet and a main valve operated by a diaphragm to vary the extent of its opening to produce at the outlet an output of compressed gas at a pressure which is reduced from the inlet pressure and closely regulated to a substantially constant value. One side of the diaphragm is enclosed by a first dome which continously communicates with the outlet and the other side of the diaphragm is enclosed by a second dome which continuously communicates with a relief valve. To change the output pressure, the pressure at which the relief valve opens can be varied and adjusted either manually or by an electromechanical actuator. To cause the diaphragm to produce a control force for moving the valve, a restricted orifice communicates with both domes to bleed compressed gas from the first dome into the second dome and is preferably carried by the diaphragm. Preferably, the domes are also connected through a manually closed by-pass valve which opens when the pressure in the first dome tends to exceed that required to fully close the main valve.

9 Claims, 2 Drawing Sheets

PRESSURE REGULATOR

This invention relates to compressible fluid control devices and more particularly to a gas pressure regulator.

BACKGROUND

Gas pressure regulators have a wide variety of industrial applications, including regulating the pressure of compressed air supplied to machinery, equipment and pneumatic tools used in a wide variety of manufacturing and assembly operations. In many industrial applications air is supplied at an unregulated pressure of about 100 to 150 psig. The regulators produce a reduced output pressure which can be varied and is usually in the range of about 10 to 125 psig.

Previously, pressure regulators have been of two general types. In one type, a main valve or variable area orifice is controlled and adjusted by a movable diaphragm subjected to the regulated or secondary output pressure on one side and an adjustable force produced by a spring on the other side. This type of regulator requires a high spring force and spring rate which results in a relatively imprecise regulation of pressure and requires a large control force which makes adjustment of the regulated pressure difficult and time consuming. Typically, for industrial pneumatic tool applications, in use the secondary or output pressure of this regulator varies by about 10 psig from the nominal regulated pressure.

In the other type of pressure regulator, the main valve or variable area orifice is controlled by a diaphragm connected to the main valve and subjected to the secondary or outlet pressure on one side, and a regulated pressure on the other side. This regulated pressure usually is produced by either an orifice and relief valve or a second pilot regulator. To provide precision regulation, this regulated pressure is produced by a pilot regulator with a pilot diaphragm with one face communicating with the inlet of the primary regulator. Both of the diaphragms are continuously bled through very small restricted orifices which are expensive to manufacture, prone to becoming clogged and result in the loss or wasting of considerable compressed gas and generation of considerable noise. This second type of regulator provides more precise control of the outlet pressure which varies by about 3 psig from the nominal regulated pressure. However, in most applications, the manufacturing cost, operating expense and maintenance expense of this type of regulator is prohibitive.

SUMMARY OF THE INVENTION

A pressure regulator with a control diaphragm operably connected to a main valve with one side of the diaphragm communicating with only the outlet to responsive to the secondary pressure and the other side of the diaphragm being yieldably biased and communicating with a relief valve, and a bleed restricted orifice communicating with both sides of the diaphragm. Preferably, the restricted orifice is carried by the diaphragm. Preferably, a by-pass valve relieves the secondary pressure whenever it tends to increase more than is required to fully close the main valve. Preferably, the pressure at which the relief valve opens, and hence the secondary pressure can be varied and adjusted, either manually or electrically.

OBJECTS, FEATURES AND ADVANTAGES OF THIS INVENTION

Objects, features and advantages of this invention are to provide a regulator with improved precision in regulating the pressure of the output gas, which achieves such improved precision utilizing a single diaphragm, can be adjusted and controlled either manually or electrically, requires relatively little force to adjust the pressure, has a relatively small loss of compressed gas, significantly less tendency for its orifice to become clogged and in operation is substantially less expensive, much quieter, easily adjusted and highly responsive to small changes in the input pressure, and is rugged, durable, requires relatively little service, has a long useful life in service and is of relatively simplified design and economical manufacture and assembly.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
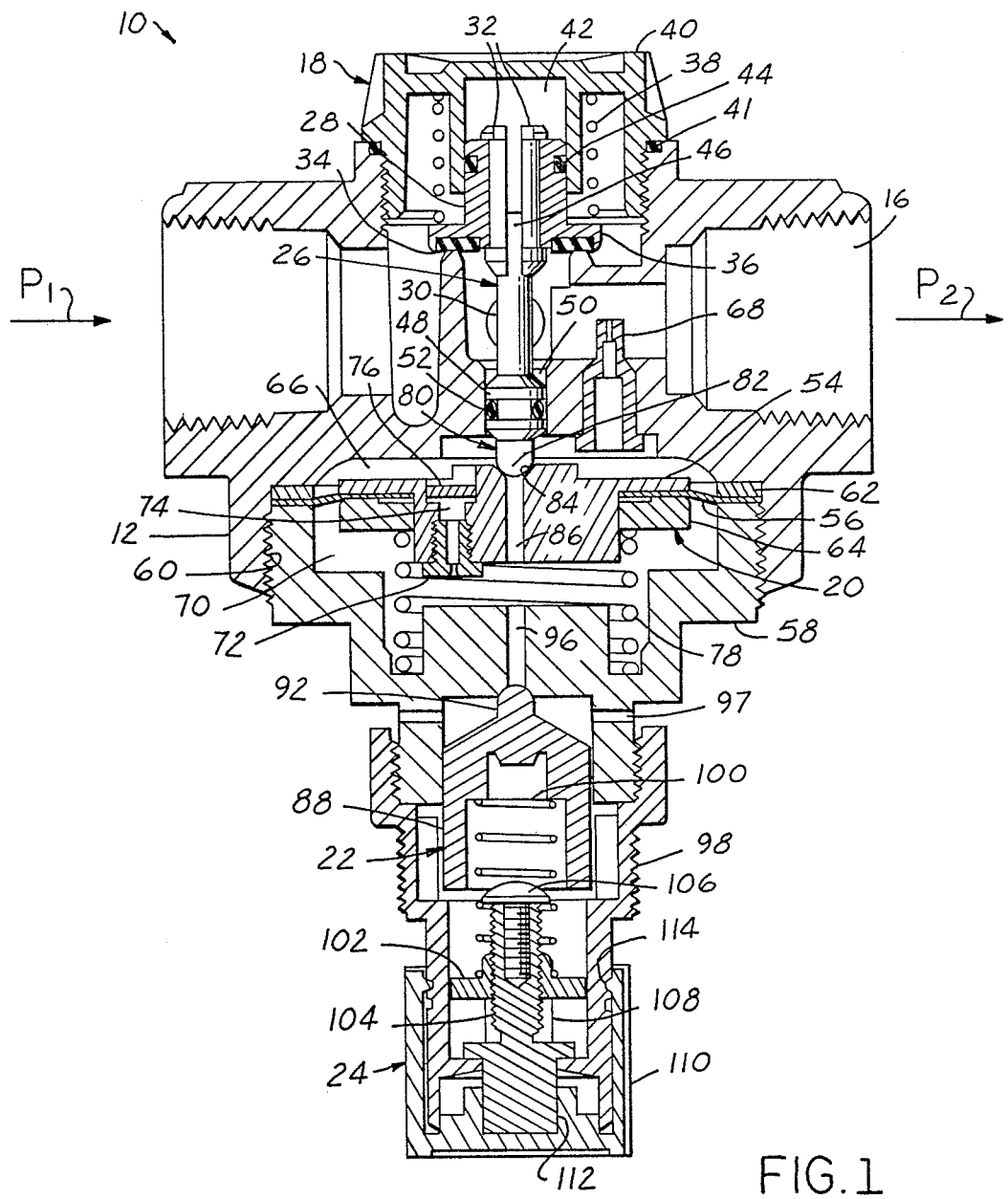
FIG. 1 is a full sectional view of a regulator embodying this invention with a manually operable mechanism for adjusting the pressure of the regulated output gas.

FIG. 1 illustrates a regulator 10 embodying this invention and having a cylindrical body 12 with an inlet passage 14 and an outlet passage 16 therein, and a main valve assembly 18 which provides a variable area orifice to control the flow of compressed gas at pressure $P_1$ from the inlet passage through the outlet passage at a reduced and regulated outlet or secondary pressure $P_2$. The main valve assembly 18 is actuated by a diaphragm assembly 20 controlled by a relief valve assembly 22. The gas pressure at which the relief valve opens can be varied and adjusted by a manual adjustment mechanism 24.

The main valve assembly has a valve 26 with a spool head 28 releasably retained on one end of a stem 30 by snap fingers 32. The head 28 has a sealing ring or washer 34 thereon of an elastomeric material which can bear on a valve seat 36 to stop the flow of gas from inlet passage 14 to the outlet passage 16. The valve is yieldably biased toward its closed position by a compression spring 38 received in a cap 40 removably threaded into the body. A gas tight seal is provided between the body and the cap by an O-ring 41 received in the cap. The spool head 28 is slidably received in a blind bore 42 in the cap and a gas tight seal is provided between them by an O-ring 44 received in the head. To reduce the force required to move the valve, the opposed end faces of the head communicate with each other through slots 46 in the stem so that they can be subjected to the same gas pressure during normal operation of the regulator. Adjacent the other end of the stem, a cylindrical journal 48 is slidably received in a bore 50 and a gas tight seal between them is provided by an O-ring 52 received in a groove in the journal.

The diaphragm assembly 20 controls and varies the extent of the opening of the main valve 26 to regulate the pressure of the output gas. This assembly has a holder 54 with a flexible diaphragm 56 received in a chamber defined by the body and a housing 58 threaded into bore a 60 in the body. A gas tight seal is provided adjacent the outer periphery of the diaphragm by a washer 62 of an elastomeric material. The diaphragm is sealed and attached to the holder by a retainer ring 64. A sealed first dome 66 is defined by the cooperation of the body, diaphragm and holder and continuously communicates with the outlet passage 16 through a Pitot tube 68, and hence the regulated gas acts on one face of the holder and diaphragm. A sealed second dome 70 is defined by the cooperation of housing 58, and the holder and diaphragm, and continuously communicates with the first dome 66 through a restricted bleed orifice 72 which is preferably received in a threaded bore 74 through the holder. To prevent foreign matter from passing through the bleed orifice, preferably, a filter 76 is received in a counterbore in the holder.

In normal operation of the regulator, there is a small pressure differential (usually less than 10 psig) between the domes 66 and 70 which causes gas to continuously bleed through the orifice 72 into the dome 70. In normal operation, the force for controlling the main valve is produced by the gas in the domes 66 & 70 acting on the holder and diaphragm and a compression spring 78 received in the dome 70 and bearing on the holder. The spring 78 produces sufficient force to open the valve when no compressed gas is supplied to the regulator and hence there is atmospheric pressure in all ports and domes thereof while producing a small enough force and having a small enough spring rate so that the valve fully closes when the inlet pressure $P_1$ is only 5 to 10 psig greater than the outlet pressure $P_2$. In practice, the spring produces only a small portion of the total control force and has a low spring rate which can be less than 10% and usually less than 5% of the normal spring rate of a conventional spring actuated regulator. Typically, spring 78 produces a force of about 24 to 30 pounds and has a spring rate of about 20 to 30 pounds per inch and spring 38 produces a force of about 2.5 to 3.5 pounds and has a spring rate of about 2.5 to 3.5 pounds per inch.

In operation, if the secondary pressure in passage 16 and hence dome 66 tends to increase more than is required for the diaphragm assembly 20 to close the valve 26, then a bypass valve assembly 80 opens to relieve the excess pressure. This insures that even if the inlet pressure $P_1$ dramatically increases rapidly the outlet pressure $P_2$ does not exceed that for which the regulator is adjusted. This valve assembly 80 has a head 82 on one end of the stem 30 of the main valve which normally is in sealing engagement with a seat 84 in the holder 54 of the diaphragm assembly which seat communicates through a passage 86 with the dome 70.

The relief valve assembly 22 has a generally cylindrical valve body 88 slidably received in a blind bore 90 in the housing 58 and having a head 92 in sealing engagement with a seat 94 which communicates through a passage 96 with the dome 70. Compressed gas in dome 70 is bled to the atmosphere by the valve through passages 97. The valve body is entrapped and retained by a tubular auxiliary housing 98 threaded onto the housing 58. The valve body is yieldably biased towards its closed position by a compression spring 100 which bears on the valve.

In operation, the pressure $P_2$ of the outlet gas is a function of the force required to open the relief valve assembly 22. This force and hence the output pressure $P_2$ can be varied and adjusted by changing the effective length of the spring 100 or the extent to which the spring is compressed. The effective length is changed by the manual adjustment mechanism 24. This mechanism has a spring rest 102 on which the other end of the spring 100 is received. The rest is received on a threaded jack screw 104 and retained thereon by a cap screw 106 received in the stud. To prevent rotation of the spring rest 102, it has a notch therein in which a rib 108 of housing 98 is slidably received. To rotate the jack screw and thereby change the effective length of the spring, an adjustment knob 110 is fixed to the head 112 of the screw which is journalled for rotation in a bore through an end wall of the tubular housing. The knob is retailed for rotation on the tubular housing by an annular rib 114 which is received in a complimentary groove in the housing.

Figure 2:
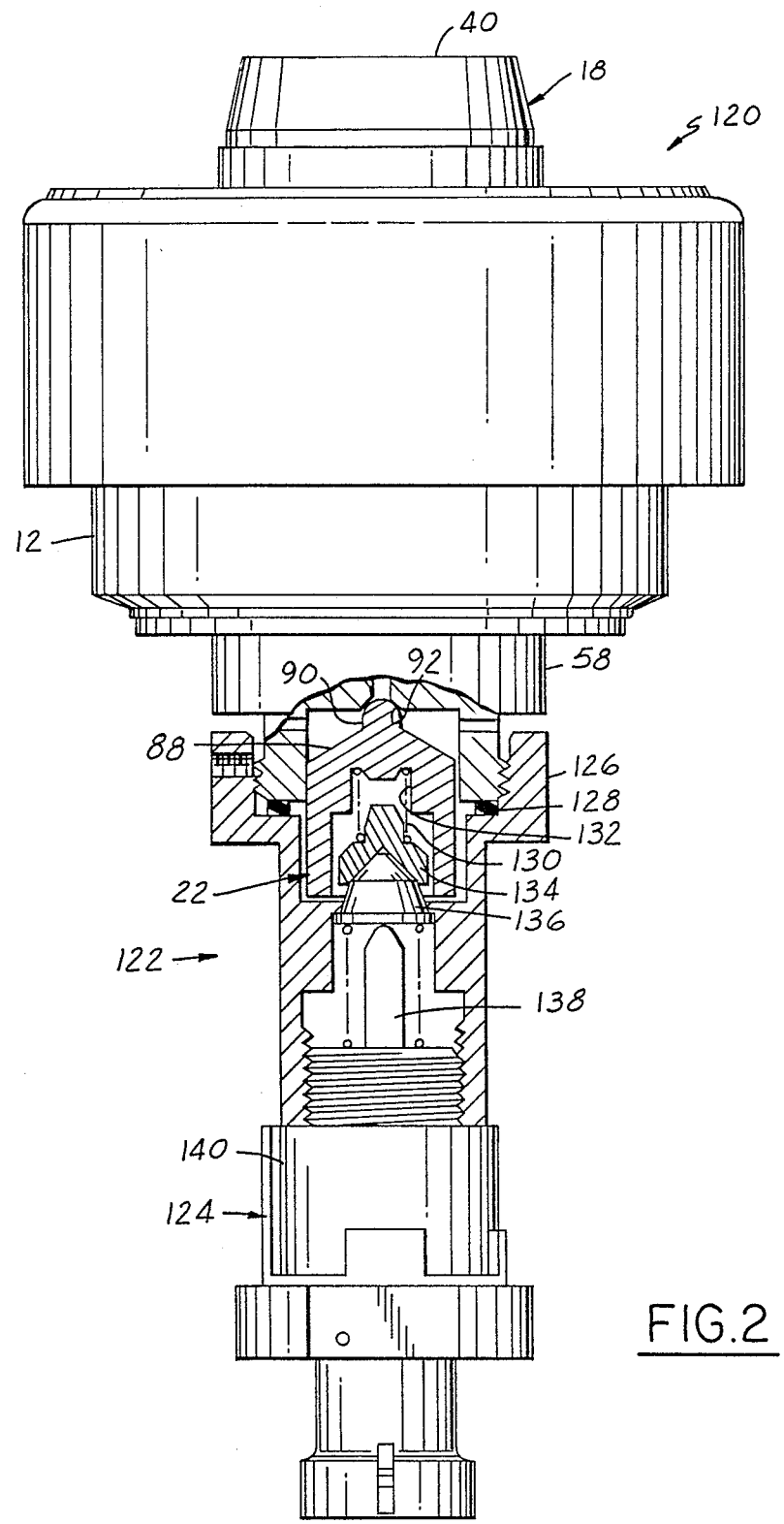
FIG. 2 is a side view with portions broken away and in section of a modified regulator embodying this invention with an electrically actuated mechanism for adjusting the pressure of the regulated output gas.

FIG. 2 illustrates a modified pressure regulator 120 which is the same as pressure regulator 10 except it has an electrically actuated adjustment mechanism 122 for varying and adjusting the pressure $P_2$ of the outlet gas in lieu of the manual adjustment mechanism 24. The mechanism 122 has a linear actuator 124 threaded into one end of a tubular housing 126 threaded onto the auxiliary housing 58 with a spacer 128 between them. The valve 88 is yieldably biased towards its closed position by a compression spring 130. One end of the spring is received in a blind bore 132 in the valve body and the other end is received over a guide 134 resting on a pintle 136 connected to an actuator rod 138 of the linear actuator.

To vary and adjust the effective length of the spring 130 and hence the force urging the valve 88 towards its closed position, the actuator rod is advanced and retracted by a stepper motor 140 in the actuator. The motor drives the rod through a threaded jack screw and nut arrangement which converts rotary motion of the stepper motor to linear motion of the actuator rod. The stepper motor is electrically or electronically digitally controlled by switching electric power pulses to the coils thereof. Typically, each power pulse produces a step or angular rotation of the motor of 15° which, through the threaded screw arrangement, produces an axial displacement of the actuator rod of about 0.00164 of an inch. Preferably, the stepper motor is capable of operating at a rate of at least 100 steps per second. One satisfactory linear actuator has a stepper motor which operates at a nominal rate of 160 power pulses or steps per second when driven by direct current with a nominal potential of 7.5 volts and has a total travel of the actuator rod of about 0.36 of an inch. This linear actuator is commercially available from Airpax, a North American Phillips Company, Cheshire Div., Cheshire Industrial Park, Cheshire, Conn. 06410, under the designation Series C921218 Digital Linear Actuator.

In use, the inlet 14 of the pressure regulators 10 and 120 is connected to a supply of compressed gas, such as compressed air, the pressure $P_1$ of which is not closely regulated and varies somewhat over time. For many industrial applications, this inlet pressure $P_1$ nominally is usually in the range of about 90 to 150 psig. The outlet 16 of the pressure regulator is connected to a device, such as a pneumatic power tool, which utilizes the compressed gas at a closely regulated pressure $P_2$ which is at least 10 psig less than the inlet pressure $P_1$ and does not vary significantly over time. Usually, the outlet pressure $P_2$ can be adjusted over the range from about 10 psig to a value which is about 10 psig less than the inlet pressure 16 i.e. 80 to 140 psig, where the inlet pressure $P_1$ is 90 to 150 psig.

To insure proper operation when compressed gas is first supplied to the inlet, the springs 38 and 78 and other components of the valve and diaphragm assemblies 18 & 20 are constructed so that (a) the valve assembly is at least partially open when no compressed gas is applied to the regulator and thus, all domes, chambers and passages are at atmospheric pressure, and (b) the valve assembly will fully close when the inlet pressure $P_1$ is equal to or greater than the desired minimum regulated outlet pressure $P_2$. The minimum setable outlet pressure $P_2$ usually is about 10 psig. In practice, this means the force produced by the diaphragm spring 78 on the valve assembly is somewhat greater than the force produced by the spring 38 on the valve assembly.

Since valve assembly 26 is always open when compressed gas is initially supplied to the inlet passage 14, gas flows past the valve and into the dome 70 via outlet passage 16, Pitot tube 68, dome 66, and restricted orifice 72 (also, intermittently, through by-pass valve 80 and passage 86) until the pressure of the gas in dome 70 is equal to the pressure at which the relief valve assembly 82 is set to open and bleed the compressed gas in dome 70 to the atmosphere. This causes the pressure of the gas at the outlet 16 to rapidly increase or bootstrap up until it reaches the pressure set by the relief valve.

In practice, the outlet pressure $P_2$ rapidly increases or bootstraps up in a few seconds to the pressure at which the relief valve is set to open. Thereafter, due to restricted orifice 72, a small quantity of gas continuously bleeds to the atmosphere through the relief valve 22. When and as compressed gas flows from the outlet 16 to operate a device connected thereto such as a pneumatic tool, very slight changes in the output pressure $P_2$ (less than 3 psig) act on the diaphragm to move it to maintain the pressure $P_2$ at a substantially constant value. Hence the main valve, diaphragm and relief valve assemblies, act as a servo loop mechanism which opens the valve assembly 26 when the pressure $P_2$ decreases slightly and closes the valve assembly as the pressure $P_2$ increases slightly to thereby produce a substantially constant outlet pressure $P_2$ for both a wide and rapid variation in the flow rate of compressed gas through the outlet 16 and a rapid variation of the inlet pressure $P_1$. In practice, this output pressure has a total variation of less than 3 psig, and usually about 2 psig, over a full range from no flow at the outlet 16 to a flow rate of about 100 Standard CFM.

The orifice functions to insure flow upon initial application of compressed gas to the inlet, provide a constant bleed across the diaphragm and produce a control force for the regulator. In operation, the constant bleed of compressed gas through orifice 72 provides a force for controlling the main valve assembly. The pressure differential between domes 66 and 70 and hence, across orifice 72 is always relatively small and constant regardless of the regulated pressure $P_2$ i.e. normally less than 10 psig and often less than 5 psig. Usually, regulators can be designed so that when this pressure differential is in the range of about 4 to 7 psig, there is no adverse effect on the responsiveness or response time of the main valve to the slight variations in the pressure of the gas at the outlet 16. Due to this small pressure differential, the air wasted by bleeding to the atmosphere through the relief valve is greatly reduced and the orifice diameter is substantially greater than that of the orifices of conventional pressure regulators. Thus, orifice 172 is far less likely to become clogged or contaminated with foreign matter under normal field operating conditions, and is much quieter and less costly to manufacture.

Moreover, only a small force is required to adjust the outlet pressure $P_2$ produced by the regulators 10 and 120. In practice, they usually require a force of less than 6 pounds for an output pressure $P_2$ of 250 psig and less than 3 pounds for an output pressure of 125 psig. Thus, both manual and electromechanical adjustment mechanisms require very little force, and can easily and readily vary and adjust the desired output pressure. Indeed, the force required for adjustment is so small that an electromechanical mechanism can utilize an inexpensive stepper motor to produce this force. The motor can be used in either an open or closed loop which can be readily powered by the output of a computer, programmable controller, dedicated board, manually operated rheostat and the like.

One practical application of a pressure regulator embodying this invention with an inlet pressure $P_1$ of about 125 to 135 psig and a regulated output pressure $P_2$ which can be adjusted in the range of about 10 to 125 psig for supplying compressed gas to a pneumatic power tool at a maximum flow rate of about 20 to 1000 standard cubic foot per minute, has a main valve with a mass of about 0.1 of a pound, an unbalanced effective area (the valve area exposed to $P_1$ on one side and $P_2$ on the other side) of 10%, and a maximum displacement of 0.100 of an inch, an effective area of the diaphragm assembly exposed to the secondary pressure $P_2$ is usually in the range of 0.75 to 4.0 and often 2.25 to 3.25 of a square inch, a valve spring 38 having a spring rate of 3 pounds per inch and producing a force of 3 pounds when the valve is closed, a diaphragm spring 78 having a spring rate of 25 pounds per inch and producing a force of 27 pounds when the valve is closed, and a relief valve 92 having when closed an effective area exposed to the gas pressure in the dome 70 of 0.0134 of a square inch. In normal operation of this relief valve, the total variation or droop of the regulated output pressure is less than 2½ psig and usually about 2 psig. The cost of manufacture of this regulator is about 25% less than that of a conventional regulator of comparable performance and output capacity.

What is claimed is:

1. A gas pressure regulator comprising, a body, a gas inlet port in said body, a gas outlet port in said body, a main valve assembly carried by said body, communicating with both said inlet port and said outlet port, movable to closed and open positions and constructed and arranged when fully closed to prevent the flow of gas from said inlet to said outlet, a diaphragm carried by said body and operably connected with said main valve for moving it toward one of its open or closed positions in response to a slight change in pressure of a compressed gas in said outlet passage, a first dome enclosing one side of said diaphragm and continuously communicating with said outlet passage so that compressed gas therein acts on said one face of said diaphragm, a second dome enclosing the other face of said diaphragm and constructed and arranged so that compressed gas therein acts on said other face of said diaphragm, a restricted orifice communicating with both of said domes to continuously bleed compressed gas from said first dome into said second dome, and a relief valve continuously communicating with said second dome and constructed and arranged to open at a predetermined pressure of gas in said second dome to bleed gas from said second dome, whereby when compressed gas is supplied to said inlet, compressed gas can flow through said outlet at a reduced pressure which is regulated to a substantially constant pressure by the cooperation of said main valve, diaphragm and relief valve.

2. The regulator of claim 1 wherein said orifice is carried by said diaphragm.

3. The regulator of claim 1 wherein the effective area of the main valve exposed to compressed gas at the inlet pressure is only somewhat greater than the effective area of said main valve exposed to compressed gas at said outlet pressure.

4. The regulator of claim 1 which also comprises adjustment means operably associated with said relief valve and constructed and arranged to vary and adjust within a predetermined range the gas pressure at which said relief valve opens.

5. The regulator of claim 4 wherein said relief valve is movable to open and closed positions and said adjustment mechanism comprises a spring yieldably urging said relief valve towards its closed position, and adjusting means constructed and arranged to vary the effective length of said spring.

6. The regulator of claim 5 which also comprises a manually movable knob connected to said adjusting means and constructed and arranged to actuate said adjusting means to change the effective length of said spring in response to manual movement of said knob.

7. The regulator of claim 5 wherein said adjusting means comprises an electromechanical actuator operably connected with said spring to vary the effective length of said spring in response to electric current applied to said electromechanical actuator to energize it.

8. The regulator of claim 1 which also comprises a bypass valve communicating with both of the said domes and constructed and arranged to be normally closed and to open to permit gas to pass from said first dome to said second dome when the pressure of gas in said first dome tends to exceed the pressure therein required to cause said diaphragm to fully close said main valve.

9. The regulator of claim 8 wherein said relief valve comprises a seat carried by said diaphragm for movement in unison therewith and communicating with said first dome, a passage through said diaphragm communicating said seat with said second dome, and a head carried by said main valve for movement therewith and bearing on and in sealing engagement with said seat when said relief valve is closed and said diaphragm moving relative to said head to disengage said seat from said head when said relief valve is open so that gas under pressure in said first dome can flow through said passage into said second dome to thereby reduce the pressure of the gas in said first dome.

* * * * *